US007694606B1

(12) United States Patent
Williams

(10) Patent No.: US 7,694,606 B1
(45) Date of Patent: Apr. 13, 2010

(54) ERGONOMIC WHEELCHAIR HANDLE

(76) Inventor: Robert L. Williams, 2465 Bellanca Ct., Erie, CO (US) 80516

( * ) Notice: Subject to any disclaimer, the term of this patent is extended or adjusted under 35 U.S.C. 154(b) by 1274 days.

(21) Appl. No.: 11/180,005

(22) Filed: Jul. 12, 2005

Related U.S. Application Data

(60) Provisional application No. 60/587,162, filed on Jul. 12, 2004.

(51) Int. Cl.
*B62K 21/16* (2006.01)

(52) U.S. Cl. .................................................... 74/551.3

(58) Field of Classification Search ................ 74/551.1, 74/551.2, 551.3, 551.4, 551.5, 551.6, 551.7, 74/551.8, 551.9; 16/421
See application file for complete search history.

(56) References Cited

U.S. PATENT DOCUMENTS

| | | | | | |
|---|---|---|---|---|---|
| 1,409,142 | A | * | 3/1922 | Gerson | 74/551.9 |
| 1,445,995 | A | * | 2/1923 | Oscar | 74/551.8 |
| D269,941 | S | * | 8/1983 | Morgan | D8/303 |
| 4,748,928 | A | * | 6/1988 | Nakamura | 114/144 R |
| 5,044,650 | A | * | 9/1991 | Eberle, Jr. | 280/304.1 |
| 5,244,225 | A | * | 9/1993 | Frycek | 280/304.1 |
| 5,265,969 | A | * | 11/1993 | Chuang | 403/94 |
| 5,290,055 | A | * | 3/1994 | Treat, Jr. | 280/304.1 |
| 5,915,712 | A | * | 6/1999 | Stephenson et al. | 280/304.1 |
| 6,101,678 | A | * | 8/2000 | Malloy et al. | 16/438 |
| 6,182,529 | B1 | * | 2/2001 | White | 74/551.1 |
| 7,500,689 | B2 | * | 3/2009 | Pasternak et al. | 280/304.1 |

* cited by examiner

*Primary Examiner*—Vicky A Johnson
(74) *Attorney, Agent, or Firm*—Emery L. Tracy

(57) ABSTRACT

An ergonomic wheelchair handle for use on a wheelchair handle bar is provided. The wheelchair handle bar has a horizontal section and a vertical section. The wheelchair handle comprises a first handle portion having a first end and a second end with the first handle portion attachable to the horizontal section of the wheelchair handle bar. A second handle portion is provided having a first end and a second end with the first end of the second handle portion pivotally connected to the second end of the first handle portion. A locking mechanism releasably locks the rotation of the second handle relative to the first handle.

11 Claims, 6 Drawing Sheets

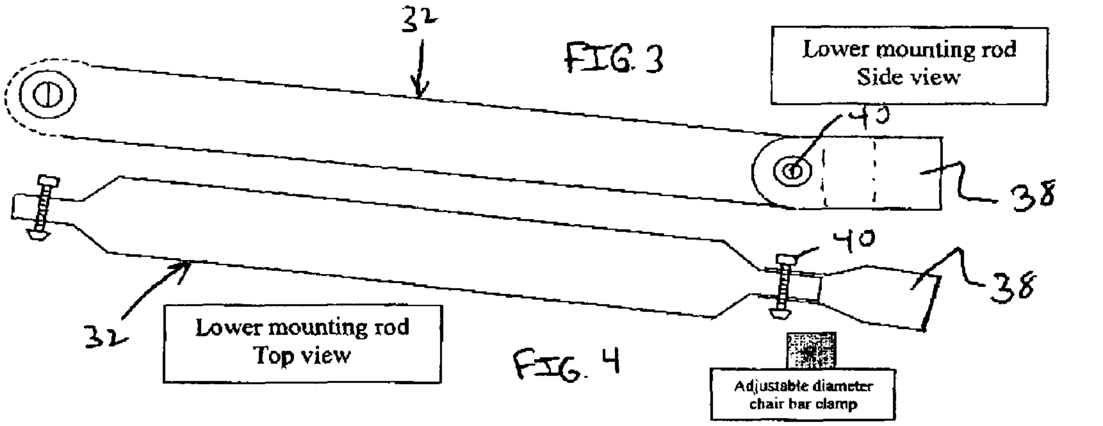
FIG. 3
FIG. 4
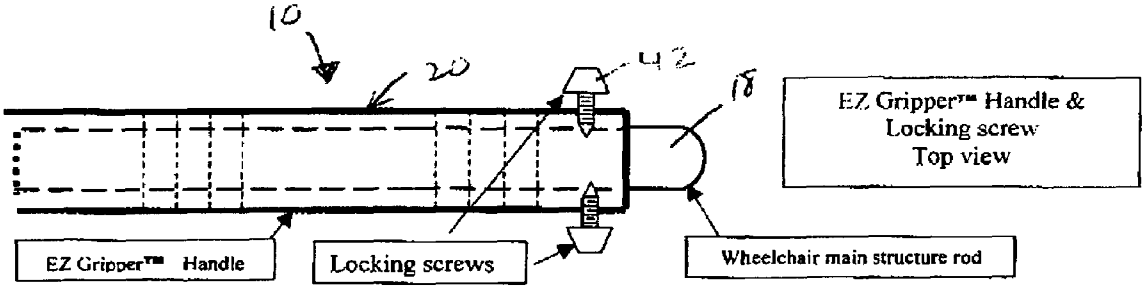
FIG. 5

ERGONOMIC WHEELCHAIR HANDLE

The present application claims priority of pending provisional patent application Ser. No. 60/587,162, filed on Jul. 12, 2004, entitled "Ergonomic Wheelchair Handle".

BACKGROUND OF THE INVENTION

1. Field of the Invention

This invention relates generally to wheelchair handles and, more particularly, the invention relates to ergonomic wheelchair handles which provides comfort to a user and allows increased holding grip and push/pull strength.

2. Description of the Prior Art

Virtually all wheelchairs manufactured in the past and present build the chairs with horizontal handles. The problem with that is there are no adjustments available for the height of the caregivers (wheel chair handler) and causes strength and gripping situations which make it difficult to maneuver the chair. In addition, even if the assistant's height is somewhat "normal", the wrist and hand angle to the forearm is at such an angle that the holding grip and push/pull strength is diminished. If an emergency arises where a chair suddenly descends at a severe downward or upward angle, the handgrip is at a major disadvantage to maintain control.

SUMMARY

The present invention is an ergonomic wheelchair handle for use on a wheelchair handle bar. The wheelchair handle bar has a horizontal section and a vertical section. The wheelchair handle comprises a first handle portion having a first end and a second end with the first handle portion attachable to the horizontal section of the wheelchair handle bar. A second handle portion is provided having a first end and a second end with the first end of the second handle portion pivotally connected to the second end of the first handle portion. A locking mechanism releasably locks the rotation of the second handle relative to the first handle.

In addition, the present invention includes a wheelchair handle device for use on a wheelchair. The wheelchair handle device comprises a single piece handle extending from the wheelchair, the handle having at least three bent portions wherein the handle has a first vertical portion, a first horizontal portion, a second vertical portion, and a second horizontal portion.

The present invention further includes a method for constructing an ergonomic wheelchair handle for a wheelchair with the wheelchair having at least one wheelchair handle bar and each wheelchair handle bar having a vertical section and a horizontal section. The method comprises providing a first handle portion having a first end and a second end, attaching the first handle portion to the horizontal section of the wheelchair handle bar, providing a second handle portion having a first end and a second end, pivotally connecting the first end of the second handle portion to the second end of the first handle portion, releasably securing the second handle portion relative to the first handle portion.

BRIEF DESCRIPTION OF THE DRAWINGS

FIG. 3 is an elevational side view illustrating a lower mounting rod for the ergonomic wheelchair handle, constructed in accordance with the present invention;

FIG. 4 is a top plan view illustrating the lower mounting rod of FIG. 3 of ergonomic wheelchair handle, constructed in accordance with the present invention;

FIG. 5 is a top plan view illustrating the ergonomic wheelchair handle, constructed in accordance with the present invention, with a locking mechanism;

DETAILED DESCRIPTION OF THE PREFERRED EMBODIMENTS

Figure 1:
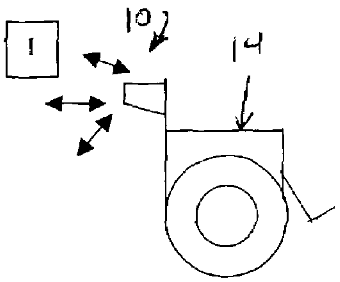
FIG. 1 is an elevational side view illustrating an ergonomic wheelchair handle, constructed in accordance with the present invention.

As illustrated in FIGS. 1-7, the present invention is an ergonomic wheelchair handle, indicated generally at 10, for mounting over a standard wheelchair handle bar 12 of a conventional wheelchair 14. Typically, the standard wheelchair handle bar 12 has a vertical section 16 and a horizontal section 18. It should be noted that while the wheelchair handle 10 of the present invention has been heretofore and will hereafter as being attachable to a standard wheelchair handle bar 12 of a conventional wheelchair 14, it is within the scope of the present invention to utilize the wheelchair handle 10 in a variety of applications with a variety of devices.

Figure 9:
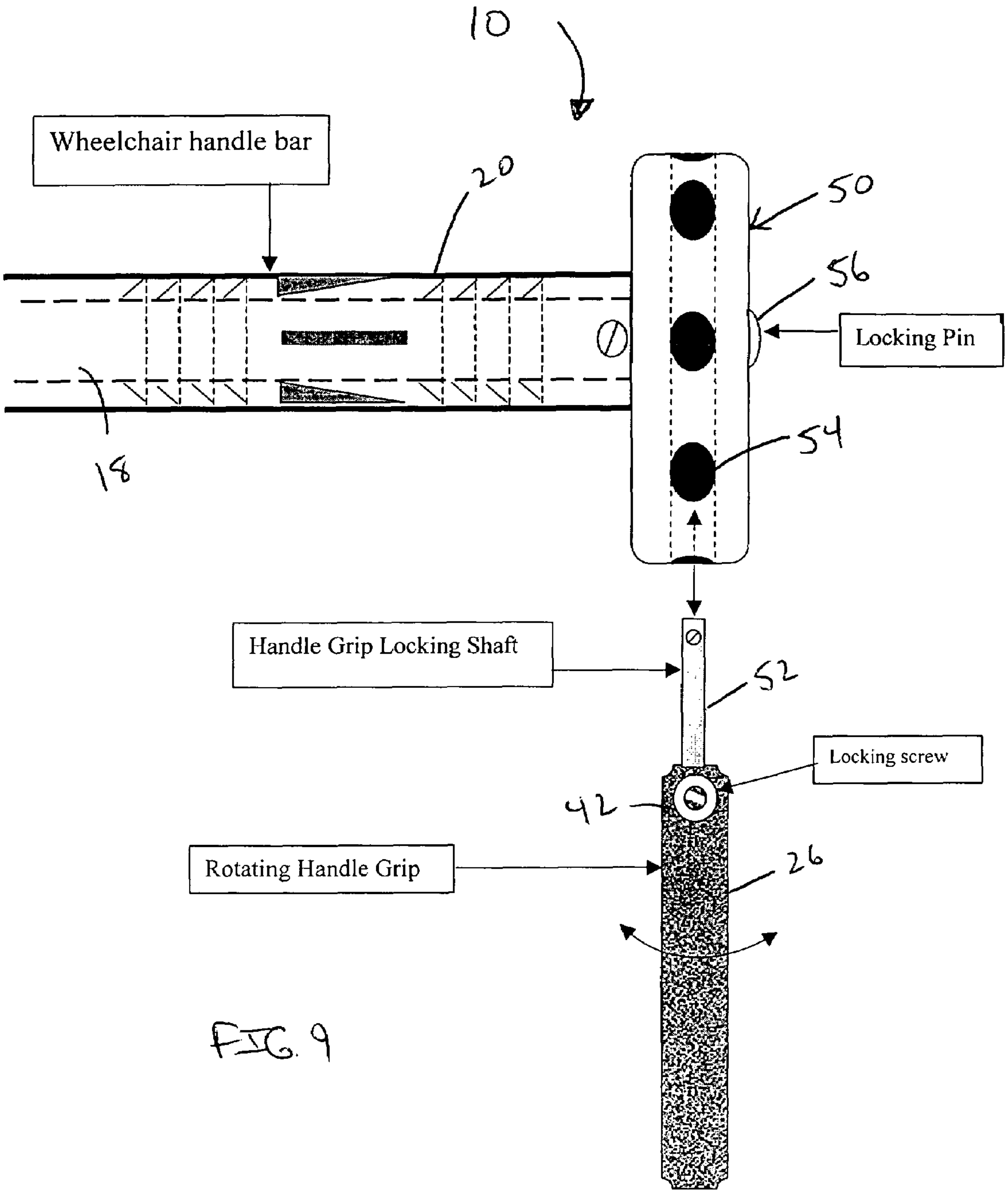
FIG. 9 is an elevational side view illustrating still another embodiment of the ergonomic wheelchair handle, constructed in accordance with the present invention.
Figure 10:
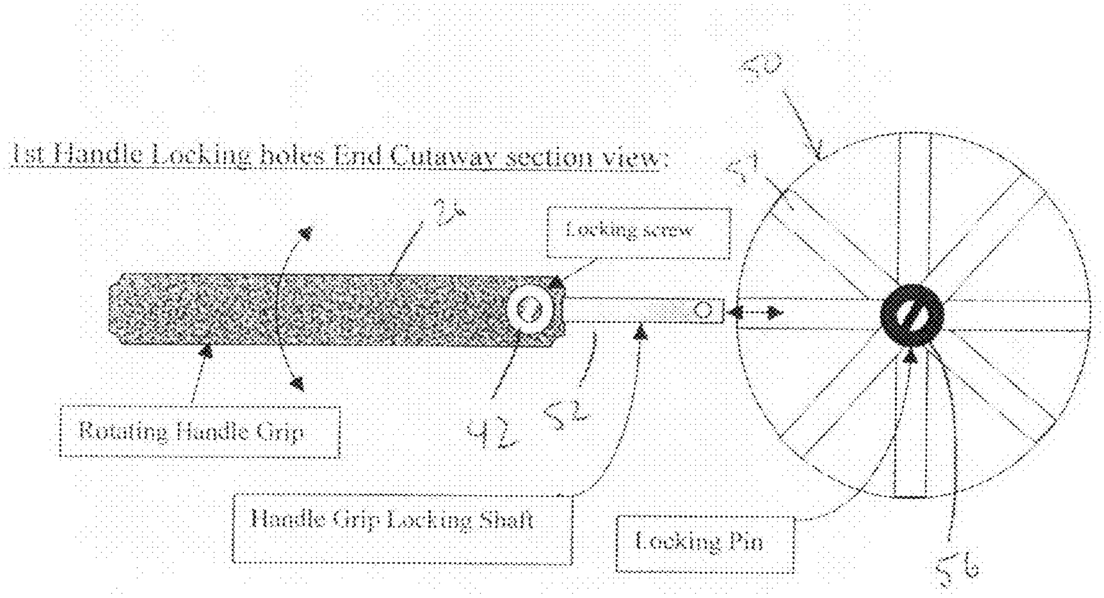
FIG. 10 is an elevational side view of the auto-locking system of the ergonomic wheelchair handle of FIG. 9, constructed in accordance with the present invention.

The wheelchair handle 10 of the present invention can be an adjustable device that easily slips on to a typical wheelchair handle bar 12 with a minimum tool requirement (pliers). The shape and adjustability of the wheelchair handle 10 allows varied angles and as many as four gripping angles without any readjustment of the unit. Once the wheelchair handle 10 is installed on the wheelchair 14, it is self-locking in place and virtually impossible to accidentally or inadvertently separate from the chair. Preferably, three locking mechanisms assure no separation under the most strenuous conditions. The locking mechanisms preferably used with the wheelchair handle 10 of the present invention will be discussed in further detail below. As illustrated in FIGS. 9-11, the wheelchair handle 10 can include an auto-locking mechanism 50.

The wheelchair handle 10 of the present invention is preferably an adjustable handle designed for lower cost and simplicity. The wheelchair handle 10 includes an auto-locking system and a lower bracket tie-down. In addition, the wheelchair handle 10 includes the simplicity of a single unit without attachments being required and is designed to be installed without tools.

The preferred components and construction of the wheelchair handle 10 of the present invention will now be discussed. As understood by those persons skilled in the art, the described components and construction are only one manner and other components and construction are within the scope of the present invention.

Figure 2:
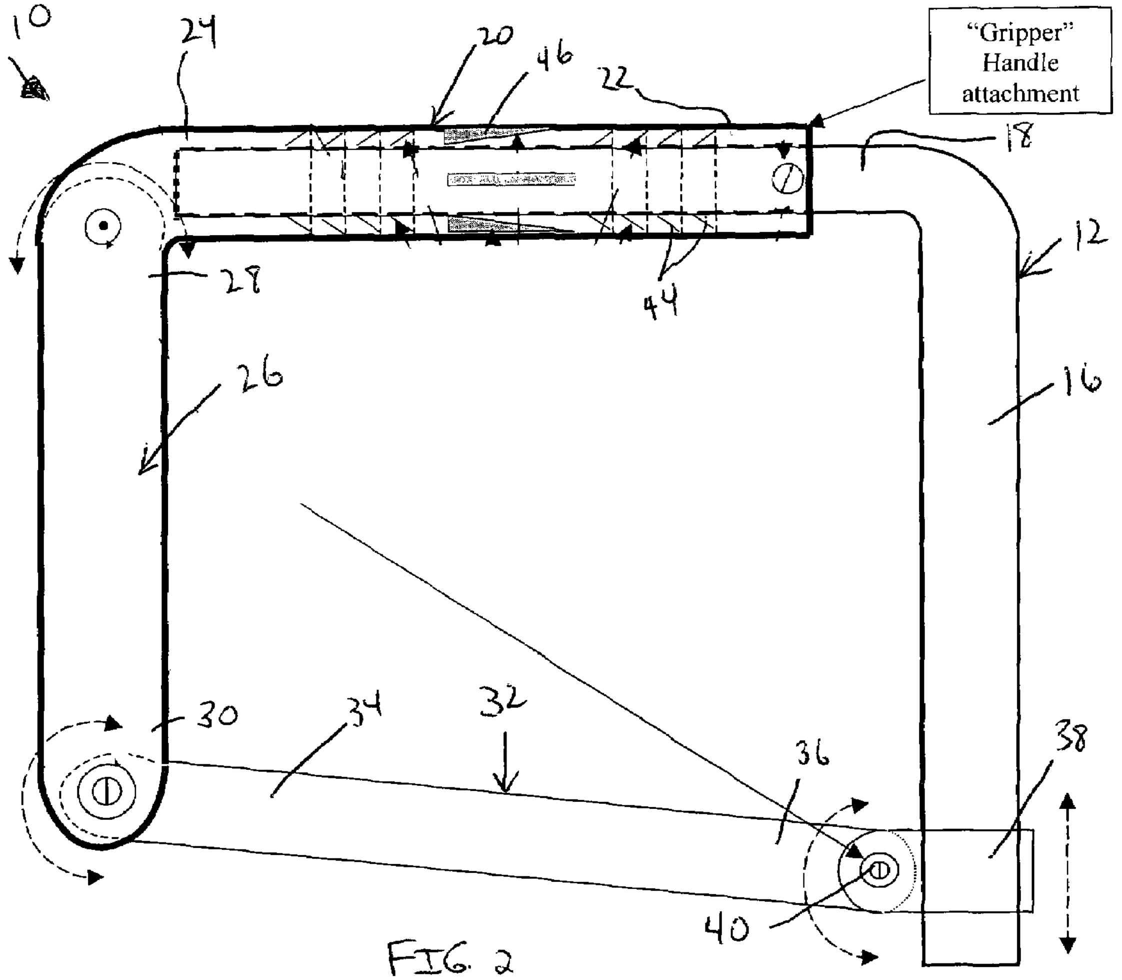
FIG. 2 is another elevational side view illustrating the ergonomic wheelchair handle, constructed in accordance with the present invention.

As illustrated in FIGS. 1 and 2, the wheelchair handle 10 of the present invention is illustrated with the handle bar 12 included. The drawings illustrate how the wheelchair handle 10 is pushed on to the standard wheelchair handle bar 12. The wheelchair handle 10 includes a first handle portion 20 having a first end 22 and a second end 24, a second handle portion 26 having a first end 28 and a second end 30, and a third handle portion 32 having a first end 34 and a second end 36.

The first handle portion 20 is preferably tubular and slides over the horizontal section 18 of the wheelchair handle bar 12. In an alternative embodiment, the first handle portion 20 can slide into the hollow portion of the horizontal section 18 of the wheelchair handle bar 12. The first end 28 of the second handle portion 26 is pivotally connected to the second end 24 of the first handle portion 20. The first end 34 of the third handle portion 32 is pivotally connected to the second end 30 of the second handle portion 26. The second end 36 of the third handle portion 32 is pivotally connected to either the vertical section 16 of the handle bar 12 or a clamp 38 secured to the vertical section 16 of the handle bar 12.

As indicated above, there are preferably three swivel points that allow adjusting of the angle of the gripping modes of the wheelchair handle 10 of the present invention. The third handle portion 32 preferably slides in a generally upward and downward direction relative to the standard wheelchair handle bar 12 and allows personalized, custom angles to be selected by positioning the third handle portion 32 and then tightening it into position. The third handle portion 32 is preferably attached to the handle bar 12 of the wheelchair 14 with the wrap around clamp 38 that does not intrude into the wheelchair seat and back area and is secure through a bolt 40 on the third handle portion 32 side. The first end 34 of the third handle portion 32 can also be tightened relative to the second handle portion 26 for stability. Also depicted are the locking screws or bolt 42 (securement means) and the one-way teeth 44 formed on the inside surface of the first handle portion 20 that secure the first handle portion 20 to the horizontal section 18 of the handle bar 12. In an alternative embodiment in which the first handle portion 20 slides into the hollow portion of the horizontal section 18 of the wheelchair handle bar 12, the teeth 44 can be formed on the outside surface of the first handle portion 20.

As illustrated in FIGS. 3 and 4, the third handle portion 32 and clamp 38 with locking mechanism is described and illustrated. The drawings and description illustrate and describe the shape of the third handle portion 38 and its connecting devices to pivot or swivel and lock to the wheelchair handle bar 12.

Figure 6:
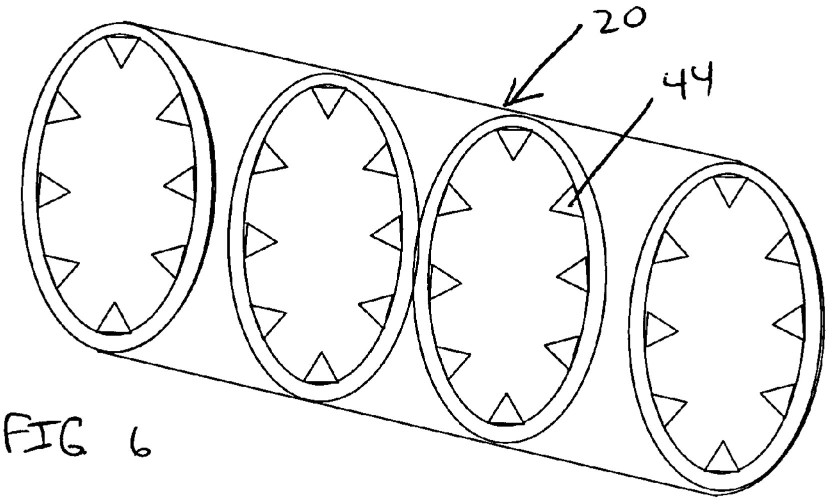
FIG. 6 is a perspective view illustrating the ergonomic wheelchair handle constructed in accordance with the present invention, with one-way teeth grabbers.
Figure 7:
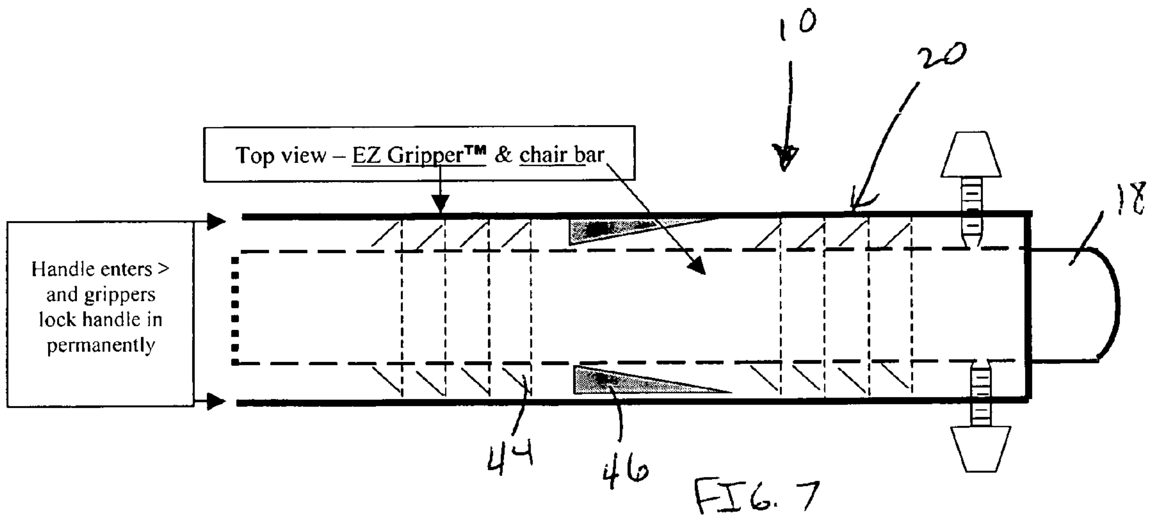
FIG. 7 is an elevational side view illustrating the ergonomic wheelchair handle of FIG. 6, constructed in accordance with the present invention, with a locking mechanism.

As illustrated in FIGS. 5-7, the handle locking screws or bolts 42 and the locking teeth mechanism 44 are illustrated. FIG. 5 illustrates the locking screws 42 that tighten the first handle portion 20 to the horizontal section 18 of the wheelchair handle bar 12. FIG. 6 further illustrates the serrated locking teeth 44 formed on an inside surface of the first handle portion 20 contactable with the horizontal section 18 of the wheelchair handle bar 12. FIG. 7 illustrates the teeth 44 and stamped indentations 46 formed on the inside surface of the first handle portion 20 which also inhibit handle back off motion relative to the wheelchair handle bar 12.

Figure 8:
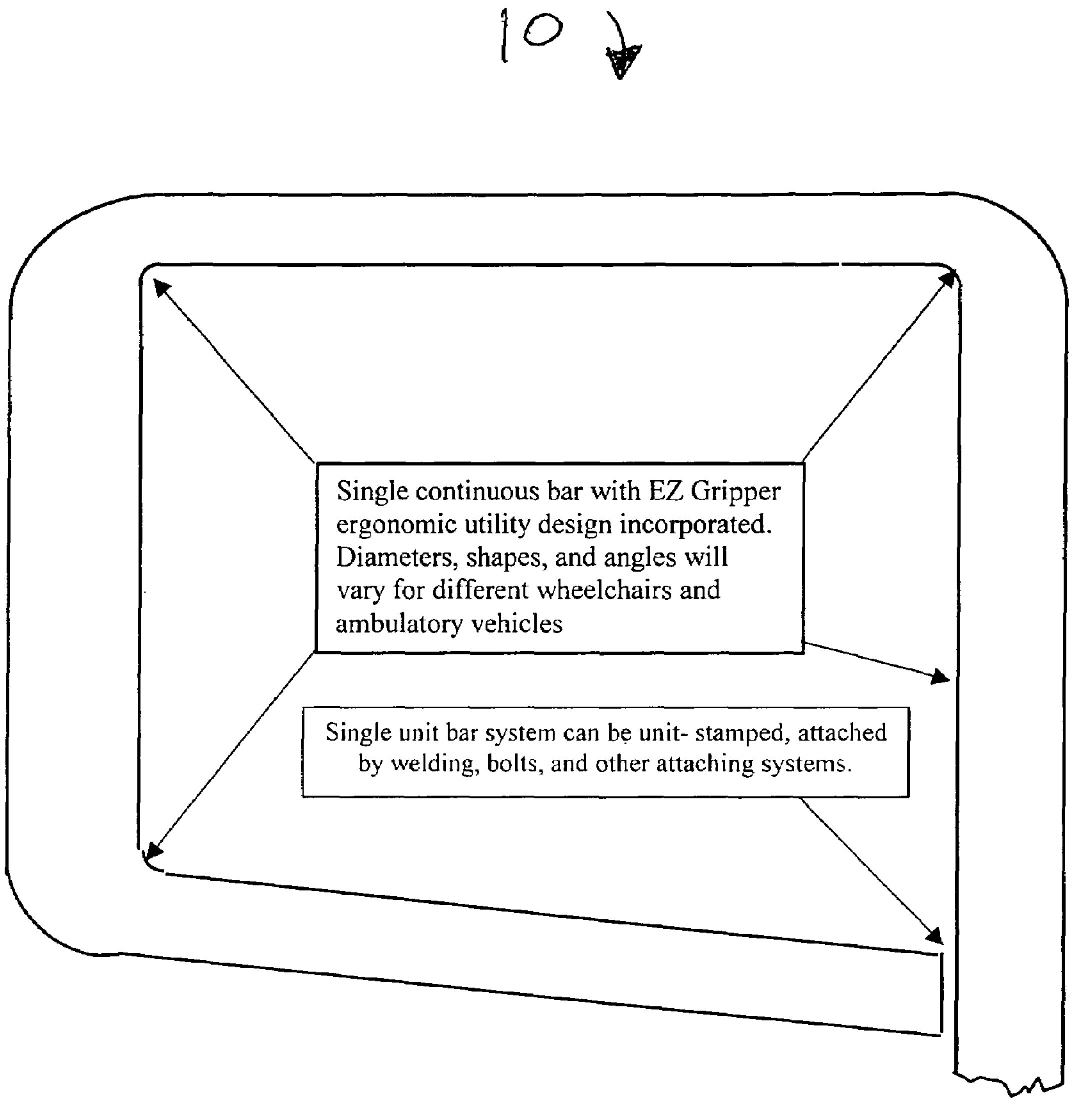
FIG. 8 is an elevational side view illustrating another embodiment of the ergonomic wheelchair handle, constructed in accordance with the present invention.

As illustrated in FIG. 8, the wheelchair handle 10 of the present invention includes the utility usage design for OEM companies that choose to install the wheelchair handle's 10 multiple angle holding system for wheelchairs 14 and other similar caregiver enhancement control. It is within the scope of the present invention to include all ergonomic wheelchair handles 10 which are bent vertically or otherwise described within the present application. The present application includes bending or otherwise deforming a current wheelchair handle for ergonomic handling.

While the wheelchair handle 10 of the present invention has been illustrated and described wherein the second handle portion extends in a generally downward direction relative to the horizontal section of the wheelchair handle bar, it is within the scope of the present invention for the second handle portion to extend in a generally upward direction or horizontal direction relative to the horizontal section of the wheelchair handle bar.

As illustrated in FIGS. 9-11, the first handle portion 20 can be releasably locked into many various angles by pulling the shaft 52 of the second handle portion 26 out of a locking hole 54 on the auto-locking ratchet mechanism 50 and moving the second handle portion 26 to a new desired angle and relocked by pushing the shaft 52 of the second handle portion 26 into the desired locking hole 54 and reinserting a locking pin 56. The auto-locking ratchet mechanism 50 is designed with several angled slotted holes 54 to accommodate the various angles of direction the caregiver may choose. Loosening the locking screw 42, selecting a new angle, and retightening the locking screw 42 can further change the angles.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. An ergonomic wheelchair handle for use on a wheelchair handle bar, the wheelchair handle bar having a horizontal section and a vertical section, the wheelchair handle comprising:

a first handle and a second handle, each of the first handle and the second handle comprising:

a first handle portion having a first end and a second end, the first handle portion attachable to the horizontal section of the wheelchair handle bar;

a second handle portion having a first end and a second end, the first end of the second handle portion pivotally connected to the second end of the first handle portion; and locking means for releasably locking the rotation of the second handle portion relative to the first handle portion;

wherein the first handle is separate from the second handle such that the first handle and the second handle are moveable independently from each other.

2. The wheelchair handle of claim 1 and further comprising:

securement means for securing the first handle portion to the horizontal section of the wheelchair handle bar.

3. The wheelchair handle of claim 2 wherein the first handle portion is tubular and the securement means is a plurality of serrated locking teeth formed on an inside surface of the first handle portion contactable with the horizontal section of the wheelchair handle bar.

4. The wheelchair handle of claim 2 wherein the first handle portion is tubular and the securement means is at least one locking screw extending through the first handle portion and the horizontal section of the wheelchair handle bar.

5. The wheelchair handle of claim 2 wherein the first handle portion is tubular and the securement means is stamped indentations formed on an inside surface of the first handle portion contactable with the wheelchair handle bar, the stamped indentations providing a one-way lock between the first handle portion and the horizontal section of the wheelchair handle bar.

6. The wheelchair handle of claim 1 wherein the locking means is a locking screw releasably securing the position of the second handle portion relative to the first handle portion.

7. The wheelchair handle of claim 1 and further comprising:

a third handle portion having a first end and a second end, the first end of the third handle portion pivotally connected to the second end of the second handle portion and the second end of the third handle portion pivotally connected to the vertical section of the wheelchair handle bar.

8. The wheelchair handle of claim 7 and further comprising:

a locking screw releasably securing the position of the third handle portion to the second handle portion.

9. The wheelchair handle of claim 7 and further comprising:

a swivel mount secured to the vertical section of the wheelchair handle bar, the second end of the third handle portion pivotally connected to the swivel mount; and a third locking screw releasably securing the position of the third handle portion to the swivel mount.

10. The wheelchair handle of claim 1 wherein the second handle portion extends in a direction relative to the first handle portion selected from the group consisting of generally downward, generally upward, and any direction between generally upward and generally downward.

11. A wheelchair handle device for use on a wheelchair, the wheelchair handle device comprising:

a first handle and a second handle, each of the first handle and the second handle comprising:

a single piece member extending from the wheelchair, the member having at least three bent portions;

wherein the member has a first vertical portion, a first horizontal portion, a second vertical portion, and a second horizontal portion;

wherein the first handle is separate from the second handle such that the first handle and the second handle are moveable independently from each other.

* * * * *